United States Patent
Nystrom et al.

(10) Patent No.: US 7,380,215 B2
(45) Date of Patent: May 27, 2008

(54) INTEGRATED DISPLAY OF GUAGES

(75) Inventors: Olof Markus Nystrom, Gothenburg (SE); Carl Oscar Thrane Lundgren, Malmo (SE)

(73) Assignee: Microsoft Corporation, Redmond, WA (US)

( * ) Notice: Subject to any disclaimer, the term of this patent is extended or adjusted under 35 U.S.C. 154(b) by 392 days.

(21) Appl. No.: 11/096,496

(22) Filed: Mar. 29, 2005

(65) Prior Publication Data

US 2006/0035691 A1 Feb. 16, 2006

Related U.S. Application Data

(63) Continuation of application No. 10/134,142, filed on Apr. 26, 2002, now Pat. No. 7,073,125.

(51) Int. Cl.
*G06F 17/00* (2006.01)

(52) U.S. Cl. ............... 715/772; 715/762; 715/764; 715/866; 345/204; 345/205

(58) Field of Classification Search .......... 715/747, 715/703, 866, 763, 834, 733, 832; 33/501, 33/574; 345/204, 205
See application file for complete search history.

(56) References Cited

U.S. PATENT DOCUMENTS

| | | | | |
|---|---|---|---|---|
| 5,259,333 A | * | 11/1993 | Iino et al. | 116/286 |
| 5,406,303 A | | 4/1995 | Salmon et al. | 345/75.1 |
| 5,578,985 A | * | 11/1996 | Cremers et al. | 340/461 |
| 6,259,981 B1 | * | 7/2001 | Wilcosky | 701/29 |
| 6,404,333 B1 | | 6/2002 | Ayres et al. | 340/461 |
| 6,625,562 B2 | | 9/2003 | Hayashi et al. | 702/145 |
| 6,667,726 B1 | * | 12/2003 | Damiani et al. | 345/1.1 |
| 6,856,884 B2 | | 2/2005 | Traylor | 701/70 |
| 2003/0076369 A1 | * | 4/2003 | Resner et al. | 345/864 |

OTHER PUBLICATIONS

Dailey, Bill. 1998. Review of AVSIM Combat Sim Review Jane's Israeli Air Force. 7 pp. Available http://www.avsim.com/pages/1098/janes_iaf/IAF.html.
THARSYS. 2000. Race Car Dashboards. 2 pp. Available http://ourworld.compuserve.com/homepages/tharsys/dashbo.htm.
Stratics. 2000. Designed By Liquidfish Software. JumpGate Stratics. An Introduction to JumpGate. 4 pp. Available http://jg.stratics.com/sections/introduction/interface/flighthud.shtml.
U.S. Appl. No. 60/358,272, filed Feb. 20, 2002.
U.S. Appl. No. 60/362,042, filed Mar. 6, 2002.

* cited by examiner

*Primary Examiner*—Tadesse Hailu
(74) *Attorney, Agent, or Firm*—Lee & Hayes, PLLC

(57) ABSTRACT

An integrated display including a plurality of analog gauges concentrically arranged about a common center. Each analog gauge includes a pointer indicating a value of a parameter represented by the analog gauge. The integrated display is optionally semi-transparent and superimposed over a background view in a computer game, simulation, or other software application. The pointer and analog gauge may move relative to each other, or one may be fixed at an easily recognizable location while the other moves to indicate a current value of a parameter. This display can also be used on an electronic device to indicate a plurality of independent parameters in a minimal space.

20 Claims, 7 Drawing Sheets

INTEGRATED DISPLAY OF GUAGES

RELATED APPLICATION

This application is a continuation of a patent application, Ser. No. 10/134,142, filed on Apr. 26, 2002, now U.S. Pat. No. 7,073,125 the benefit of the filing date of which is hereby claimed under 35 U.S.C. § 120.

FIELD OF THE INVENTION

The present invention generally relates to a method for indicating to a user of an electronic device the status of a plurality of parameters, in a minimal space, and more specifically, pertains to an integrated display of concentric analog gauges that are integrated into a single display.

BACKGROUND OF THE INVENTION

Computer games and other software applications often must graphically display a plurality of gauges or other indicators to convey information of interest to a user. Typically, however, each of the plurality of gauges is separately overlaid upon the display using a large portion of the available space. For example, in a computer simulated automobile racing game, a large area of the visual display is devoted to separate gauges and indicators that display parameters such as a vehicle's speed, engine rotational speed, fuel level, gear selection, and other information of interest to a driver of the vehicle.

Such information is sometimes provided as part of a "heads up display" (HUD) comprising multiple gauges overlying a view through a port of a window. For example, an automobile in a racing game may include a tachometer, a speedometer, a fuel gauge, a turbocharger indicator, and a gear indicator that are displayed as a HUD over the view of the race course and of other cars seen by the driver through the front window of the vehicle. These gauges display the parameters most commonly accessed to determine the state of an automobile and are the most important to the driver in such a game. Thus, in this and other types of games, it is necessary that the player be able to easily see these gauges and the information they present. However, the traditional method of separately displaying the necessary gauges in a HUD uses too much of the valuable visual area of the display. Because each gauge is separately superimposed or overlaid upon the background visible through the window in the display, the HUD tends to obscure too much of the action in a game, making the game less enjoyable and more difficult to play.

Clearly, it would be desirable to reduce the area occluded by gauges in a display as much as possible. One way to decrease the area used by the gauges is to cycle through the gauges on the display in some predefined order. Typically, the game player must perform a specified action to cause the program to cycle from displaying a current gauge to displaying a next gauge. This method typically uses only a portion of the display to display a gauge, and only one gauge may be shown at a time to provide information to the game player. This method of cycling through the various gauges helps to reduce the display area obscured, since only one gauge is displayed at a time, but the game player cannot concentrate on the game action when cycling through different gauges to display the gauge that provides desired information. Requiring a player to cycle through the gauges wastes valuable time and is distracting. The time wasted to find information needed to play a game is frustrating and reduces the enjoyment of the game experienced by a player.

Another problem that arises in the prior art when a plurality of gauges must be displayed is that the computing resources required for rendering the separate gauges can perceptively slow the game, particularly on a computer with marginal computational and display rendering capabilities. Also, to increase the realism of a game simulation, computer games often render objects three-dimensionally (i.e., using 3D rendering). In a racing game, 3D-rendered gauges might be rendered in a 3D dashboard to simulate the inside of a real automobile. However, 3D rendering requires more computer resources and can reduce overall game speed on systems with inadequate processor speed and insufficient random access memory (RAM). To remedy this problem, the prior art simply enables the player to turn off some of the less important gauges. However, this approach limits the player's enjoyment of the game by limiting the information available.

Certain games make the HUD relatively complicated by including too many gauges, making it virtually impossible for the average player to make sense of all the information presented in the gauges. For example, a space flight game called JumpGate by StraticsCom, Inc. employs a HUD that includes arcing bar indicators, flashing light indicators, a multitude of color indicators, text, digital values, and percentages of other parameters. The HUD further includes crosshairs for targeting weapons and is disposed in the center of the screen such that the central portion of the display area is generally occluded. The multiple arcing bar indicators are arranged about the center of the crosshairs, and each arcing bar indicator indicates a relative value of a different parameter. For example, a velocity meter is graphically represented as an arc that simulates a plurality of light emitting diodes (LEDs). As velocity increases, additional simulated LEDs light up along the arc. A corresponding numerical velocity value is displayed as a digital number in another location of the display. Similarly, a fuel meter is represented as a curved line that extends or retracts along an arc as the fuel level increases or decreases, respectively, but a corresponding numerical fuel level is not shown. Although arranged about a common center, these arcing bar indicators do not display a numerical value with the visual arc. Thus, the game player must look in different locations to obtain complete information, and it appears that this arrangement is unnecessarily complex.

There is an advantage in organizing information concentrically around a common center on a gauge. Such an approach appears to require less space to convey information than spatially separate gauges. Some simple gauges integrate numerical and graphic information around a common center using parameters that are directly related to each other. For example, the graphic analog clock accessible in the task bar on a personal computer includes numerical values around a clock face. A second hand, a minute hand, and an hour hand rotate about the center of the same clock face. Because seconds, minutes, and hours are directed to the same parameter (time) and are indicated over the same range (i.e., zero to sixty minutes represented over a period of twelve hours), the same numerical values are relevant to each hand. However, the prior art does not appear to disclose concentric gauges that use different ranges and/or different values to indicate the status of several independent parameters.

As noted above, it would be desirable to minimize the display area required by gauges and indicators for providing information needed by a user in a game and in other software programs. Specifically, it would be desirable to provide an integrated, easy to read display of multiple independent parameters that is compact and sufficiently simple to enable a user to rapidly understand the information presented therein. It would also be desirable to provide an integrated display that can be semi-transparently superimposed over an underlying view, and to enable a user to change the size and location of such a display. It would further be desirable to provide an integrated display that has the functionality of traditional separate gauges, yet does not require excessive rendering time.

SUMMARY OF THE INVENTION

The present invention is directed to a method and system for integrating a plurality of independent parameters into a single integrated display. Each parameter is represented as an analog gauge with indicia that indicate values on a corresponding scale arranged in a concentric ring about a common center. The integrated display is preferably semi-transparent so as not to occlude an underlying view in a display. The common center is disposed where desired in a display, and each analog gauge is configured to have a desired size, scale, orientation, and other characteristics. A rotational pointer moves independently to indicate a current value of the corresponding parameter.

A preferred embodiment enables a user to change units or other configuration characteristics of the integrated display. For example, the user may configure one or more needles to remain stationary at an easily recognizable location, such as the twelve o'clock position, while the corresponding one or more concentric gauges rotate about the common center. The integrated display may further include status indicators that change color, light, or provide a warning. Non-concentric indicators may also be incorporated into the integrated display at a selected position relative to the center.

The present invention thus provides an integrated way of displaying dynamic values for multiple parameters on a single display, rather than using a separate and distinct gauge for each parameter. The invention can be incorporated into any electrical or mechanical device, or in a graphic display that is software driven for displaying a plurality of dynamic data in a compact area.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary Operating Environment

Figure 1:
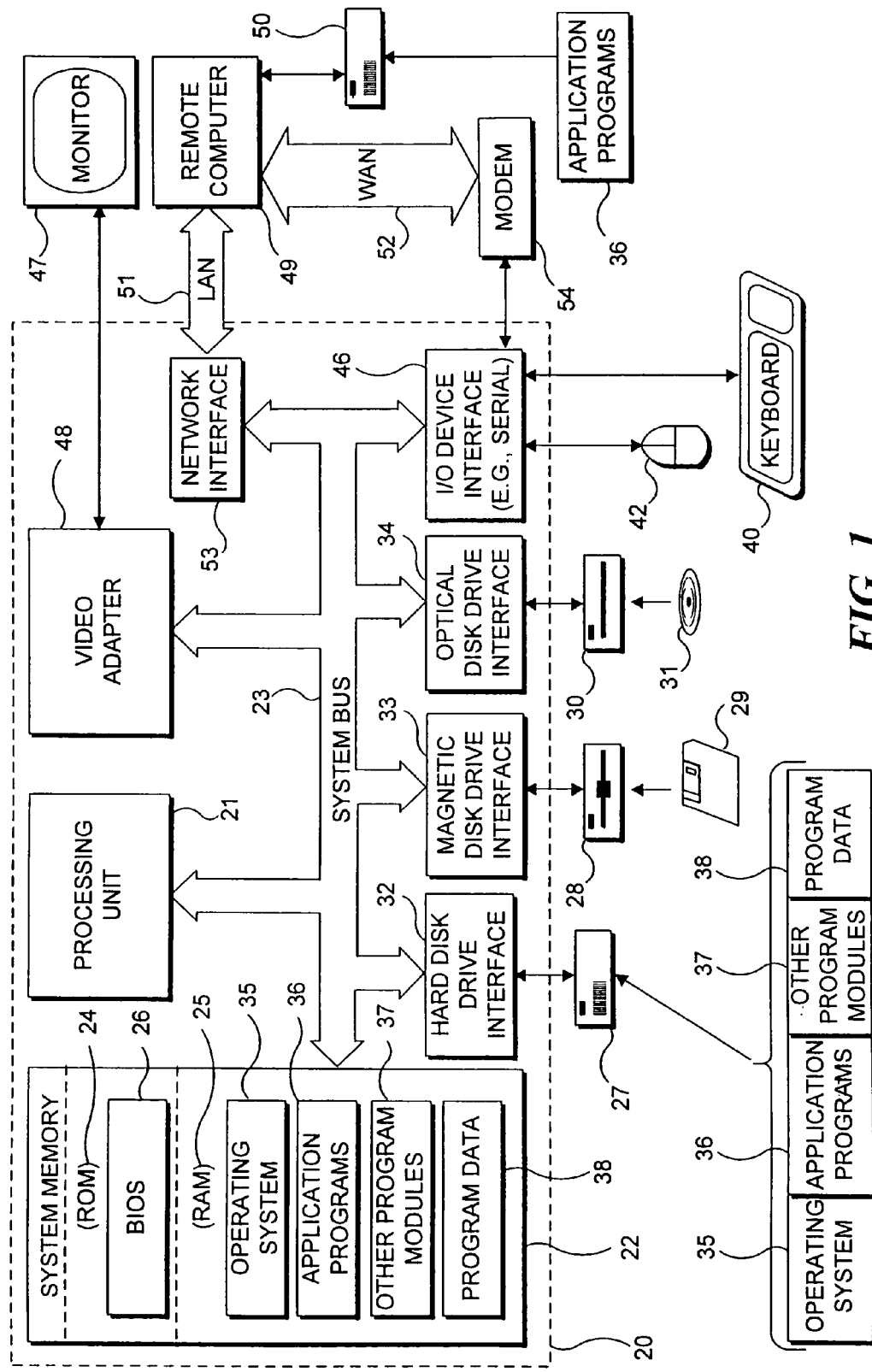
FIG. 1 is a block diagram of an exemplary system for implementing the present invention, using a general purpose computing device in the form of a conventional personal computer (PC)

FIG. 1 and the following discussion are intended to provide a brief, general description of a suitable computing environment in which the present invention may be implemented. The invention may be practiced on a single computing device, but can also be practiced on a client computing device coupled in communication with a server and/or one or more other remote computing devices over a communication network. Both the client computing device and the server will typically each include the functional components shown in FIG. 1. Although not required, the present invention will be described in the general context of computer executable instructions, such as program modules that are executed by a PC. Generally, program modules include application programs, such as computer simulations, routines, objects, components, functions, data structures, etc. that perform particular tasks or implement particular abstract data types. Also, those skilled in the art will appreciate that this invention may be practiced with other computer system configurations, including game consoles, hand-held devices, pocket personal computing devices, digital cell phones. The invention may be hardwired or wirelessly connect to a network, other microprocessor-based or programmable consumer electronic devices, multiprocessor systems, network PCs, minicomputers, mainframe computers, and the like. The present invention may also be practiced in distributed computing environments where tasks are performed by remote processing devices that are linked through a communications network. In a distributed computing environment, program modules may be located in either or both local and remote memory storage devices.

With reference to FIG. 1, an exemplary system for implementing the present invention includes a general purpose computing device in the form of a conventional PC 20, which is provided with a processing unit 21, a system memory 22, and a system bus 23. The system bus couples various system components, including the system memory, to processing unit 21 and may be any of several types of bus structures, including a memory bus or memory controller, a peripheral bus, and a local bus using any of a variety of bus architectures. The system memory includes read only memory (ROM) 24 and RAM 25. A basic input/output system (BIOS) 26, containing the basic routines that help to transfer information between elements within the PC 20, such as during start up, is stored in ROM 24. PC 20 further includes a hard disk drive 27 for reading from and writing to a hard disk (not shown) and may include a magnetic disk drive 28 for reading from or writing to a removable magnetic disk 29, and an optical disk drive 30 for reading from or writing to a removable optical disk 31, such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein includes a hard disk, removable magnetic disk 29, and removable optical disk 31, it will be appreciated by those skilled in the art that other types of computer readable media, which can store data that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, or optical disk 31, or in ROM 24 or RAM 25, including an operating system 35, one or more application programs 36, other program modules 37, and program data 38. A user may enter commands and information into PC 20 through input devices such as a keyboard 40 and a pointing device 42. Pointing device 42 may include a mouse, stylus, wireless remote control, or other pointer. Other input devices (not shown) may include a joystick, game pad, wheel, pedal, microphone, satellite dish, scanner, digital camera, digital video recorder, or the like. These and other input/output (I/O) devices are often connected to processing unit 21 through an I/O interface 46 that is coupled to system bus 23. The term I/O interface is intended to encompass each interface specifically used for a serial port, a parallel port, a game port, a keyboard port, and/or a universal serial bus (USB). A monitor 47 or other type of display device is also connected to system bus 23 via an appropriate interface, such as a video adapter 48, and is usable to display application programs, Web pages, a simulated environment, and/or other information. In addition to the monitor, PCs are often coupled to other peripheral output devices (not shown), such as speakers (through a sound card or other audio interface (not shown)) and printers.

As indicated above, the invention may be practiced on a single computing device; however, PC 20 may operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface, for establishing communications over WAN 52. One type of WAN commonly used for communication is the Internet. Modem 54, which may be internal or external, is connected to the system bus 23 or coupled to the bus via I/O device interface 46, i.e., through a serial port. In a networked environment, program modules depicted relative to PC 20, or portions thereof, may be stored in the remote memory storage device. It will be appreciated that the network connections shown are exemplary, and other means of establishing a communications link between the computers may be used, such as wireless communication and wide band network links.

Figure 2:
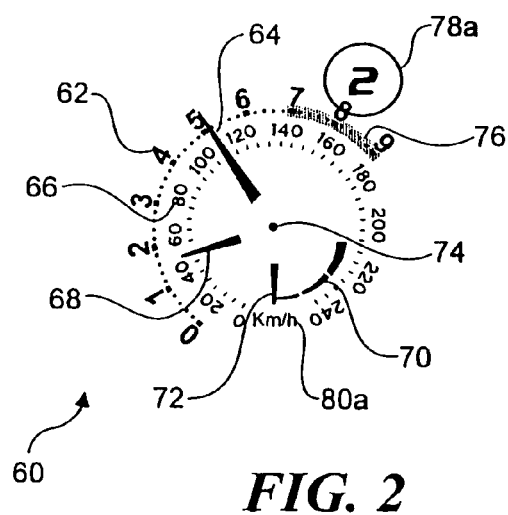
FIG. 2 is an exemplary integrated analog display showing four vehicle dashboard gauges including a tachometer, a speedometer, a turbocharger indicator, and a gear indicator, arranged in concentric rings about a common center, in accord with the present invention.

FIG. 2 illustrates an analog integrated display 60 comprising traditional vehicle dashboard gauges, namely a tachometer gauge 62, a speedometer gauge 66, a turbocharger boost gauge 70, and a gear selection indicator 78a. Tachometer gauge 62 dynamically displays a numeric analog reading of engine crankshaft rotational speed in revolutions per minute (RPM). Tachometer gauge 62 has a range from zero to 9000 RPM, where each number represents 1000 RPM. The range of tachometer gauge 62 may depend on the particular vehicle being simulated, since some vehicles have a greater range of RPM than other vehicles. Tachometer gauge 62 is equipped with a tachometer needle 64 that points to the vehicle's current RPM. In this case, tachometer needle 64 rotates in a clockwise direction about a center 74 to indicate increasing RPM. Common center 74 signifies the center point of all concentric gauges in analog integrated display 60. Tachometer gauge 62 also has an exemplary vehicle redline range 76 that extends from 7000 RPM through 9000 RPM. Any reading in redline range 76 indicates that the engine of a simulated vehicle has exceeded its maximum rated RPM.

Similarly, speedometer gauge 66 is also vehicle dependent, and dynamically displays a numeric analog reading of the vehicle's velocity between zero and 240 kilometers per hour (km/h). Units indicator 80a shows whether the velocity units are in metric (km/h) or in the English miles per hour (mph). Speedometer gauge 66 is also equipped with a speedometer needle 68 that points to the vehicle's current speed. Turbocharger boost gauge 70 is also vehicle dependent and dynamically displays an indication of turbocharger boost pressure. Turbocharger boost gauge 70 is equipped with a turbocharger boost needle 72 that points to the vehicle's current turbocharger boost pressure. In this case, turbocharger boost gauge 70 rotates in a counterclockwise direction about center 74 to indicate increasing boost pressure. Gear indicator 78a is also vehicle dependent and dynamically displays the vehicle's current transmission gear setting; in this example, the transmission includes a reverse and six forward gear settings.

Those skilled in the art will recognize that many other parameters may be displayed using additional or different gauges. For example, additional parameters that might be indicated on the gauge include fuel level, weapon charge capacity, compass heading, and other almost any other parameter of use in playing a game or useful for other purposes in other types of software programs.

Figure 3:
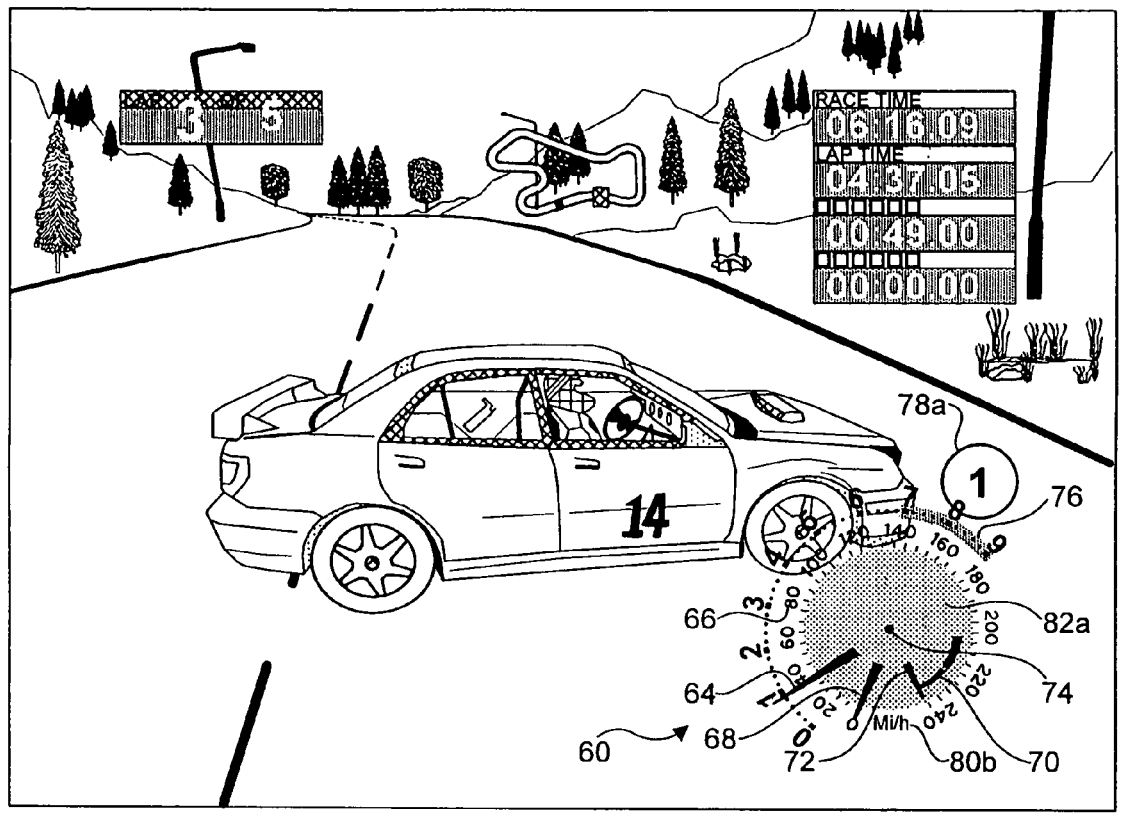
FIG. 3 illustrates the integrated analog display of FIG. 2 superimposed on an exemplary view on a display that might be produced in a driving game.

FIG. 3 shows analog integrated display 60 of FIG. 2 superimposed on an exemplary view or scene 85 during a simulation. Analog integrated display 60 is semi-transparent so that underlying activity in the simulation is still visible. Added to analog integrated display 60 is a universal warning indicator 82a centered about common center 74 within a central area of analog integrated display 60. Universal warning indicator 82a is preferably used to warn the player that the vehicle is in trouble. For example, in FIG. 3, universal warning indicator 82a is lit, indicating that the vehicle has crashed. Correspondingly, speedometer needle indicator 68 is pointing to zero, tachometer needle indicator 64 shows the vehicle engine is idling at about 950 RPM, turbocharger boost needle 72 is pointing to the lowest pressure level of the turbocharger boost, and gear indicator 78a is showing that the transmission is in first gear.

Figure 4A:
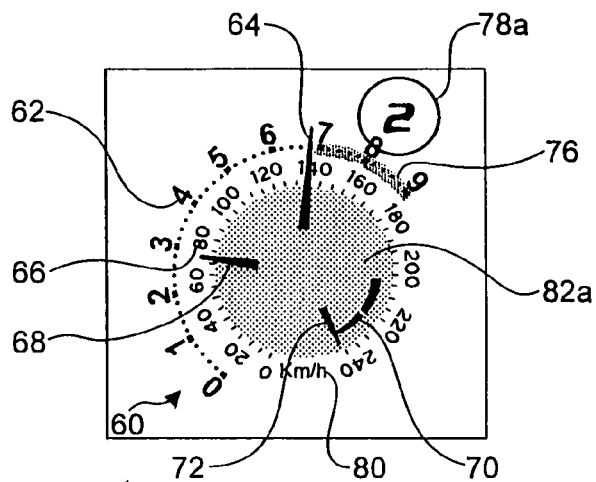
FIG. 4A illustrates an exemplary analog integrated display with a warning indicator positioned within a common center area of the analog integrated display.

FIG. 4A is an exemplary window 100a illustrating analog integrated display 60 with tachometer needle indicator 64 reaching redline range 76, causing universal warning indicator 82a to light and/or flash. In this case, universal warning indicator 82a is warning the driver to either shift to the next higher gear or reduce the engine speed of the vehicle. Speedometer needle 68 indicates that the vehicle is traveling at approximately 70 km/h, which in this case, is nearly the maximum speed of the vehicle with the current gear setting, since gear indicator 78a indicates that the vehicle transmission is in second gear.

Figure 4B:
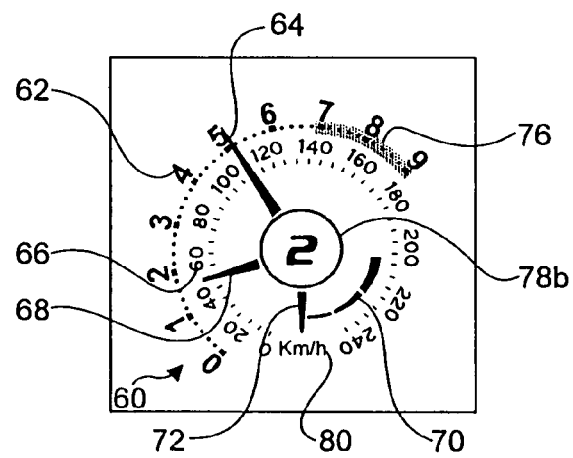
FIG. 4B illustrates an exemplary analog integrated display with a gear indicator positioned within the common center area of the analog integrated display.
Figure 4C:
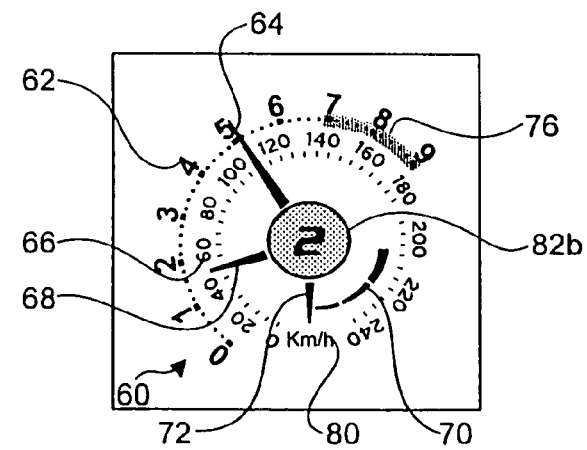
FIG. 4C illustrates an exemplary analog integrated display with the gear and the warning indicators positioned within the common center area of the analog integrated display.

FIG. 4B is an exemplary window 100b illustrating analog integrated display 60 with a gear indicator 78b centered at the common center. This configuration helps reduce the overall area of the display used by analog integrated display 60, and helps increase the visibility of the game activity. Similarly, FIG. 4C illustrates analog integrated display 60 with an integrated gear indicator and universal warning indicator 82b centered about the common center. Those skilled in the art will recognize that the integrated indicator could be placed at any desired location on or near analog integrated display 60. In FIG. 4C, integrated gear indicator and universal warning indicator 82b is lit and/or flashing, because turbocharger boost gauge 70 is at an unacceptable pressure while the vehicle is in second gear. Integrating the two gauges thus increases the simplicity of the analog integrated display 60 and increases the usability and visibility of the display.

Figure 5A:
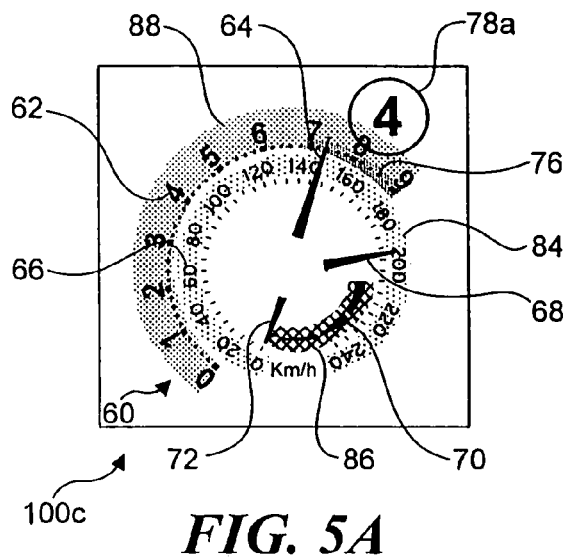
FIG. 5A illustrates an exemplary analog integrated display with a warning indicator comprising a part of a numerical ring of one of the analog gauges.
Figure 5B:
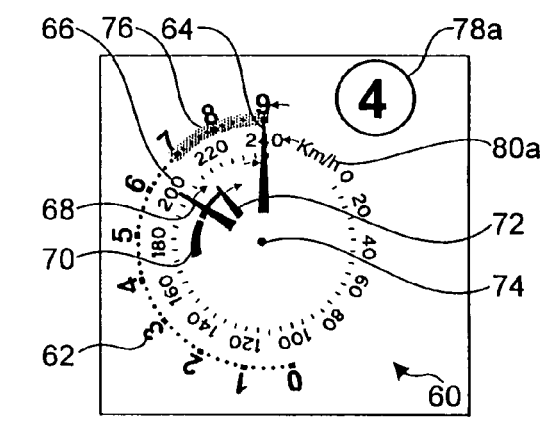
FIG. 5B illustrates an exemplary analog integrated display illustrating a tachometer needle indicator rotating in a clockwise direction to the twelve o'clock position as the tachometer concentric ring rotates to a redline indicator.
Figure 5C:
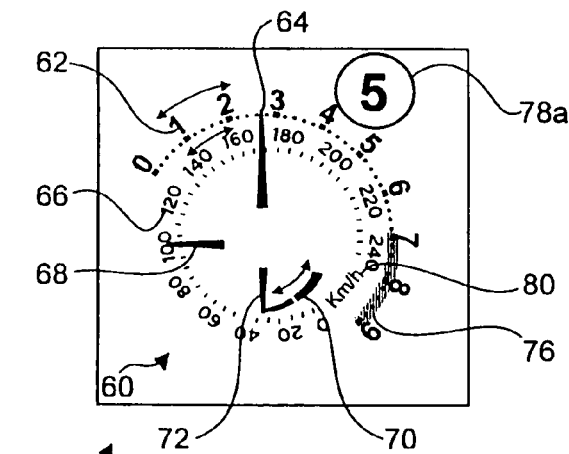
FIG. 5C illustrates an exemplary analog integrated display in which the needle indicators remain fixed as the concentric rings rotate about the common center.

Other configurations of analog integrated display 60 are possible, as shown in FIGS. 5A, 5B, and 5C. FIG. 5A is an exemplary window 100c illustrating analog integrated display 60 with a speedometer warning indicator 84 disposed about the concentric numeric ring of speedometer gauge 66. Similarly, a turbocharger boost warning indicator 86 is positioned about the concentric ring of turbocharger boost gauge 70. Likewise, a tachometer warning indicator 88 is positioned about the concentric numeric ring of tachometer gauge 62. Each warning indicator will light-up or flash when the corresponding parameter has reached a maximum threshold. For example, in FIG. 5A, the vehicle's tachometer needle 64 is within redline range 76. Prolonged operation of the engine at an RPM within redline range 76 could cause engine damage or failure in a real engine. Thus, tachometer warning indicator 88 is shown illuminated. Correspondingly, speedometer needle 68 is shown pointing to approximately 200 mph. In this case, 200 mph may be a speed at which the vehicle experiences excessive vibration, and if prolonged, could cause structural damage or failure. Thus, speedometer warning indicator 84 is illuminated. As a further example, the vehicle's turbocharger boost gauge 70 has reached an unacceptably low pressure, perhaps as a result of a ruptured gasket. Thus, turbocharger boost warning indicator 86 is lit and/or flashing to notify the game player of potential problems.

Another configuration shown in FIG. 5B illustrates an exemplary window 100d of analog integrated display 60 wherein the gauges are oriented to indicate maximum values of each parameter at the twelve o'clock position. For example, tachometer gauge 62 is oriented about center 74 so that the maximum engine speed of 9000 RPM is located at the twelve o'clock position. In this way, a player will more readily know that the engine has reached its maximum RPM when tachometer needle 64 has rotated to the twelve o'clock position. The player need not refer to the numerical value of RPM associated with this needle position. Instead, the player obtains an instinctive indication of engine RPM based on the position of tachometer needle 64 relative to the twelve o'clock position.

Similarly, speedometer gauge 66 is oriented about center 74 so that the vehicle speed is "pegged" at the twelve o'clock position. Rather than driving at the maximum rated vehicle speed, it may be preferable for a player in a driving game to maintain a lower target speed for optimal racing. For example, it may be preferable for the player to maintain a target speed of 180 km/h to pass freely through a series of timed traffic lights or handle a series of "S" curves. The target speed may be indicated by the game or determined by the player. To help the player in the game more easily recognize the target speed, speedometer gauge 66 can then be oriented so that the target speed is at an easily recognizable position or orientation. For instance, the target speed of 180 km/h is located at the nine o'clock position, which corresponds to maintaining speedometer needle 68 at a "straight and level" position.

As an alternative to using stationary gauges and moving needles, each needle and gauge may rotate opposite each other, or just the gauge may move relative to a fixed needle. For example, tachometer needle 64 may rotate in a clockwise direction as tachometer gauge 62 rotates in a counter-clockwise direction to indicate increase RPM. As the vehicle engine reaches its maximum rated RPM, both tachometer needle 64, and tachometer gauge 62 will meet at the twelve o'clock position. Similarly, turbocharger boost needle 72 and speedometer needle 68 might rotate in clockwise directions as their corresponding gauges rotate in counterclockwise directions, so that the needles reaches the twelve o'clock position as the vehicle reaches maximum levels of each corresponding parameter. This manner of indicating a parameter enables a smaller range of needle movement, so that a player can more readily notice with a short glance when a parameter is reaching its maximum rated level, when the pointer is at the twelve o'clock position.

The configuration shown in FIG. 5C illustrates an exemplary window 100e wherein tachometer needle 64, speedometer needle 68, and turbocharger boost needle 72 remain at stationary or fixed positions. Here, tachometer needle 64 is at the twelve o'clock position, speedometer needle 68 is at the nine o'clock position, and turbocharger boost needle 72 is at the six o'clock position. As each respective parameter changes during simulation, the corresponding gauge rotates in either clockwise or counterclockwise directions about the common center. This embodiment enables the player in a game to more easily focus at a specific location for reading data on a desired parameter, rather than requiring the game player to first find the current needle location for the desired parameter before determining what value that position indicates.

Figure 6:
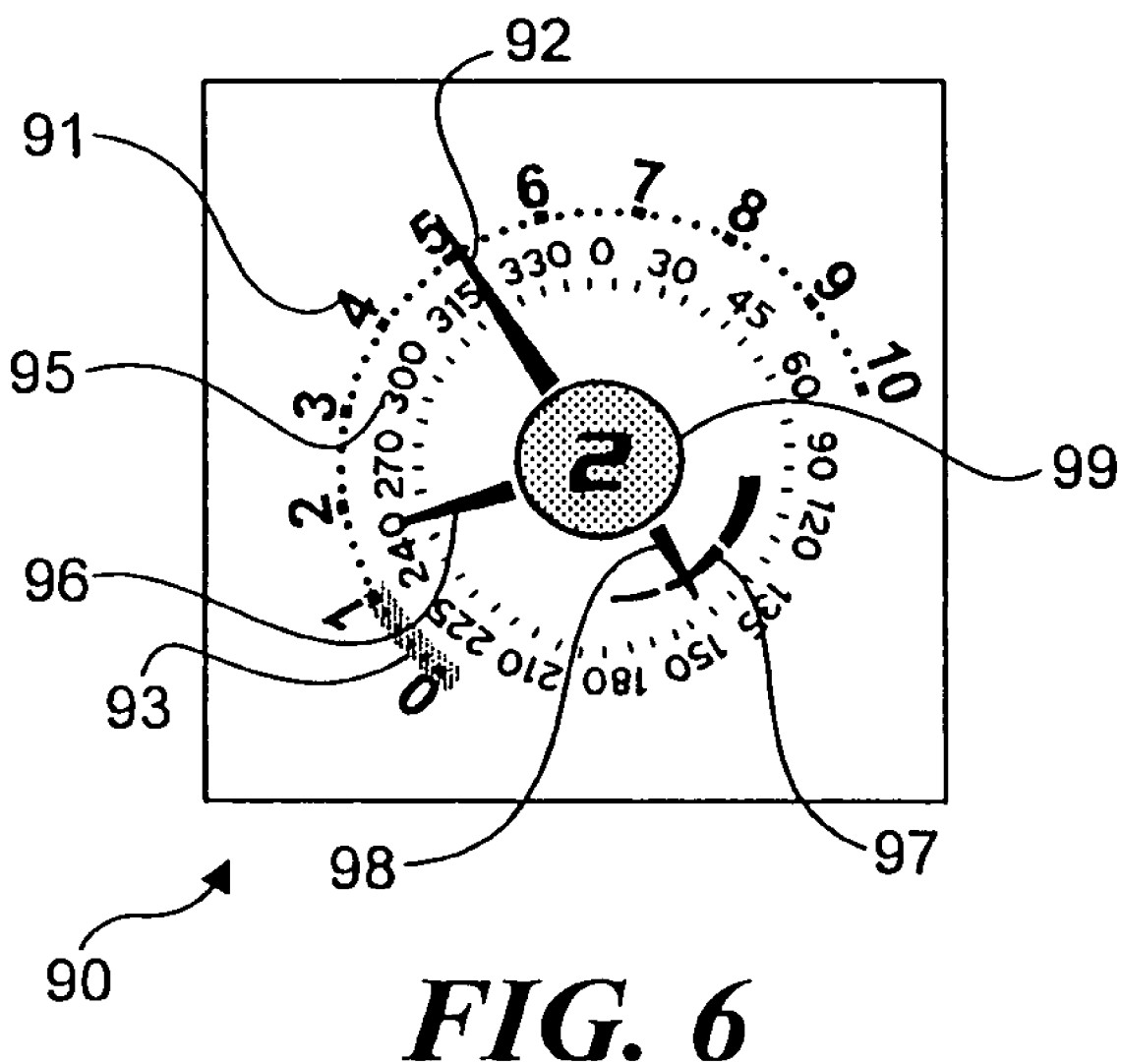
FIG. 6 illustrates an alternative embodiment of the invention as an integrated mobile communication display.

FIG. 6 illustrates an application of the invention to an integrated mobile communication display 90. Integrated mobile communication display 90 provides information relevant to a mobile communication device, and may appear in a corner of a display screen for the mobile communication device. Specifically, integrated mobile communication display 90 includes a signal strength gauge 91 that indicates the strength of a communication signal. The range of signal strength gauge 91 is represented as zero to 10, which may correspond to zero to 100%. A current signal strength is indicated by a signal strength needle 92. Signal strength gauge 91 also includes a caution indicator 93 that indicates whether a signal strength range may be unreliable. Integrated mobile communication display 90 also includes a compass gauge 95 and a corresponding compass needle 96. A battery level gauge 97 and a corresponding battery level needle 98 are also provided. At the center of integrated mobile communication display 90, a message indicator 99 shows the number of messages that are waiting.

Figure 7:
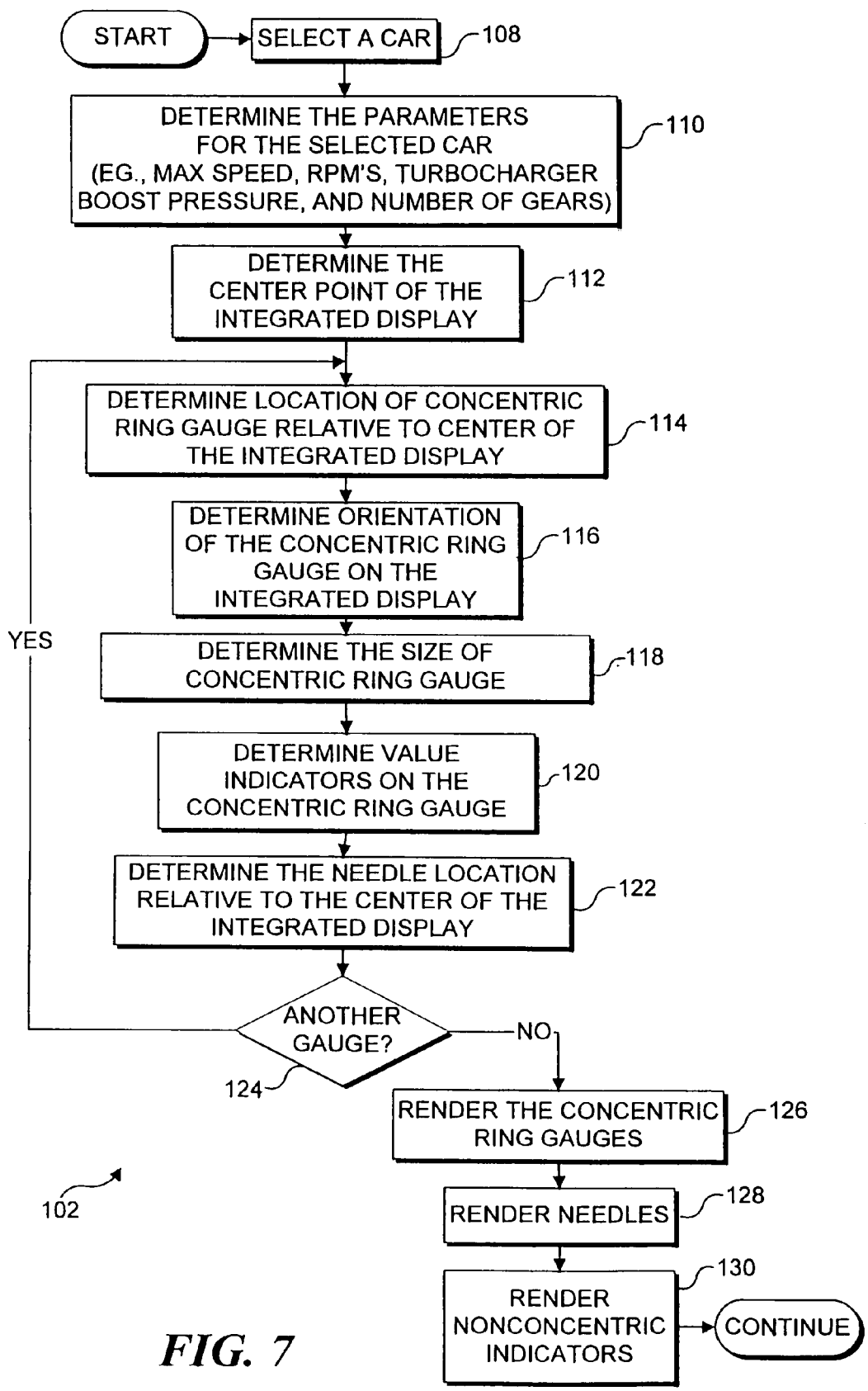
FIG. 7 is a flow diagram illustrating logic for creating and positioning the analog integrated display during a simulation.

FIG. 7 is a flow diagram 102 illustrating logic to create an analog integrated display for a selected vehicle. At a step 108, a game player selects a vehicle to be used during the game. At a step 110, a gauge module determines the parameters for the selected vehicle. Parameters may include the vehicle's maximum speed, maximum RPM, maximum turbocharger boost level, fuel capacity, number of gears available, and other characteristics of the selected vehicle, which are vehicle dependent. At a step 112, the gauge module determines a position for a common center of the analog integrated display to enable the user to place the analog integrated display where desired on the display.

At a step 114, the gauge module determines a location for a concentric ring gauge, relative to the common center. At a step 116, the gauge module determines an orientation about the common center for the concentric ring gauge. A step 118 determines a size for the concentric ring gauge, which includes the circumferential distance of the concentric ring gauge about the common center, determined as a function of the radial distance of the concentric ring gauge from the common center. At a step 120, the gauge module determines value indicators for the concentric ring gauge. Value indicators may include a numeric scale, incremental hash marks, units of measure, and/or other characteristics appropriate in indicating the values displayed on the concentric ring gauge.

At a step 122, the gauge module determines needle parameters relative to the common center for the concentric ring gauge. The needle parameters include the starting position of a first end of the needle when pointing at the values on the concentric ring gauge. The needle location may also include the position of a second end of the needle relative to the common center. These needle positions generally define the length of the needle. The gauge module may also determine other characteristics, such as the color of the needle, the color of the concentric ring gauge, and the font used for the value indicators.

At a decision step 124, the gauge module determines whether the analog integrated display will include a second concentric gauge to represent another parameter of the selected vehicle. If so, the logic returns to step 114 to generate the second concentric gauge and needle. Decision step 124 thus repetitively returns to step 114 until all of the concentric gauges have been defined. Once all of the gauges are defined, the gauge module renders all of the concentric ring gauges at a step 126. At a step 128, the gauge module renders all of the needle indicators for the corresponding concentric ring gauges. The gauge module then renders non-concentric indicators, at a step 130, and is then prepared to animate the needles to reflect changing values for each parameter.

Figure 8:
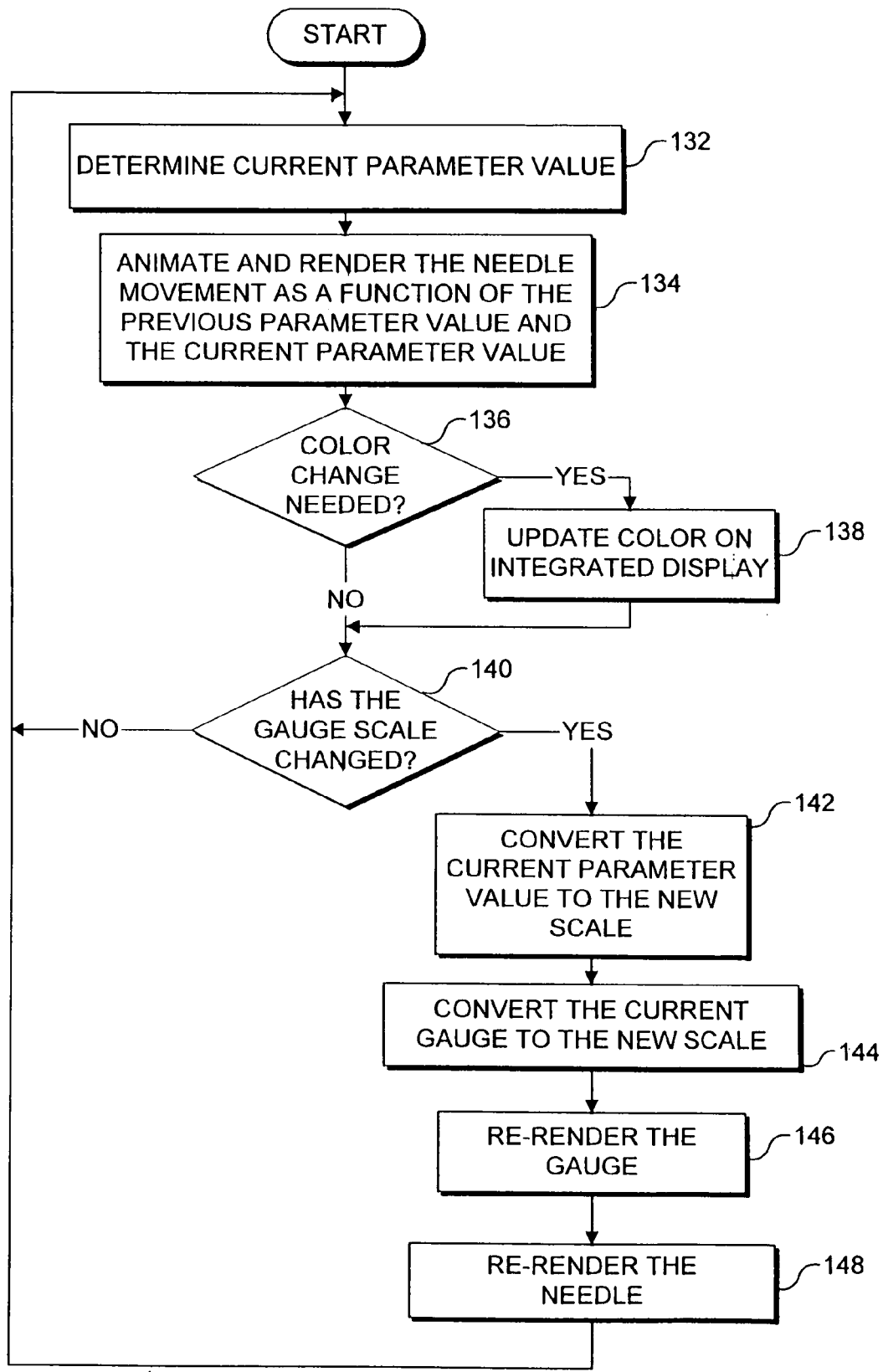
FIG. 8 is a flow diagram illustrating logic for determining and displaying a current value of a parameter on a gauge of the analog integrated display during a frame of the simulation.

FIG. 8 is a flow diagram 104 illustrating logic for determining and displaying a current value of a parameter on a gauge of the analog integrated display during a game or other simulation. For example, the following logic may be applied to determine and display the current value of a vehicle's speed during a single frame of a driving game. The same logic is implemented for every other parameter that is displayed by the analog integrated display and is also repeated for every executed frame of the game or simulation, in a continuous loop. At a step 132, the gauge module determines the current value of the current parameter. The gauge module may receive the current value from a physics engine module that calculates the parameter value based on conditions in the game or simulation. For example, the physics engine module may calculate a vehicle's speed based on a throttle setting, friction between a simulated road and simulated tires, a brake setting, and other conditions in the game or simulation. At a step 134, the gauge module animates the corresponding needle as a function of a previous parameter value and the current parameter value so that the needle is moved linearly between the previous value and the current value. Alternatively, a nonlinear function may be applied, causing the needle to move in a nonlinear fashion between the previous value and the current value, which would be appropriate for a vehicle that is rapidly accelerating or decelerating, since the speed might then be changing in a non linear fashion.

At a decision step 136, the gauge module determines whether a color of the analog integrated display should be changed in relation to the current parameter value. For example, if the vehicle speed falls to a value that is too low for the current gear setting, the gauge module may determine that the speedometer gauge should be changed to a bright red color to warn the game player to speed up or downshift. Accordingly, if the gauge module determines that a color of the analog integrated display should be changed, the gauge module updates the color, at a step 138.

Once the color of the analog integrated display is updated, or if no color change is required, at a decision step 140, the gauge module determines whether the gauge scale has changed. For example, the user may have chosen to change the speedometer scale to read in units of km/h instead of mph. If the gauge scale has been changed, the gauge module converts the current parameter value to an equivalent value under the new scale, at a step 142. Correspondingly, the gauge module converts the current scale of the concentric ring gauge to the new scale at a step 144. The scale conversion may affect the size of the concentric ring gauge, the numerical values displayed on the concentric ring gauge, the hash marks, the indication of the units, or other characteristics. At a step 146, the gauge module re-renders the concentric ring gauge in the analog integrated display. Similarly, the gauge module renders the needle, at a step 148, so that it points to the correct value on the concentric ring gauge under the new scale. Once the scale is changed, or if the scale did not need to change, control returns to step 132 for processing the next frame.

Although the present invention has been described in connection with the preferred form of practicing it, those of ordinary skill in the art will understand that many modifications can be made thereto within the scope of the claims that follow. For example, other gauges and parameters could be included such as a fuel gauge, or a weapons system gauge that may represent missiles or explosive devices. The weapons system gauge could render the type and amount of missiles or explosives available to the player in a game, within a compact analog integrated display. Those skilled in the art will also recognize that multiple integrated displays may be rendered for different sets of parameters, multiple players, or to indicate other information. As noted above, the integrated display may be incorporated into an electronic device such as a cell phone or included in an electronic display in an actual vehicle or aircraft, etc. Accordingly, it is not intended that the scope of the invention in any way be limited by the above description, but instead be determined entirely by reference to the claims that follow.

The invention claimed is:

1. A method for providing information regarding a status of a plurality of parameters to a user of an electronic device, in a compact display space, comprising the steps of:
    (a) displaying a plurality of analog gauges arrayed radially about a common central point wherein each gauge includes a range of values representative of a different one of the plurality of parameters, wherein at least one of the analog gauges moves relative to a pointer to indicate a value of the parameter to which the analog gauge corresponds; and
    (b) displaying a plurality of pointers, a first end of each pointer indicating a specific value of one of the plurality of parameters on one of the plurality of analog gauges, a second end of each pointer being displaced from the common central point, wherein at least one of the pointers moves relative to the arc of a curved analog gauge to indicate a value of the parameter to which the curved analog gauge corresponds.

2. The method of claim 1, wherein the step of displaying a plurality of analog gauges comprises the steps of:
    (a) determining a number of different parameters to be displayed by the plurality of gauges;
    (b) determining the common central point in a display area;
    (c) determining a gauge disposition relative to the common central point for each of the plurality of gauges, the number of gauges comprising the plurality of gauges corresponding to the number of different parameters to be displayed; and
    (d) displaying a different one of the plurality of gauges at each gauge disposition that was determined.

3. The method of claim 2, further comprising at least one of the steps of:
    (a) determining an orientation of each of the plurality of gauges;
    (b) determining a size of each of the plurality of gauges; and
    (c) determining a scale of values for use as indicators on each of the plurality of gauges.

4. The method of claim 2, wherein the step of displaying a plurality of pointers comprises the steps of:
    (a) determining an initial location of the first end of each pointed in relation to each gauge;
    (b) displaying the first end of each pointed at the initial location that was determined;
    (c) animating the display of each pointer by showing the pointer moving as the value of the parameter indicated by the pointer changes that further comprises the step of moving the first end of the pointer from a disposition that corresponds to a previous value of the parameter, to a new disposition corresponding to a new value of the parameter; and
    (d) animating the display of a gauge as the value of the parameter indicated with the gauge changes.

5. The method of claim 1, further comprising the step of changing a color of a component on the plurality of analog gauges to indicate a status of interest.

6. The method of claim 1, further comprising the step of displaying indicators that are non-concentric about the common central point.

7. The method of claim 1, wherein the plurality of gauges and the plurality of pointers are semi-transparent.

8. A machine readable medium storing machine instructions for performing the steps of claim 1.

9. A system for providing information regarding a status of a plurality of parameters in a compact display space, comprising:
    (a) a processor;
    (b) a display coupled in communication with the processor; and
    (c) a memory coupled in communication with the processor, said memory storing machine instructions that cause the processor to:
        (i) display a plurality of analog gauges arrayed radially about a common central point, wherein each gauge includes a range of values representative of a different one of the plurality of parameters, wherein at least one of the analog gauges moves relative to a pointer to indicate a value of the parameter to which the analog gauge corresponds; and
        (ii) display a plurality of pointers, a first end of each pointer indicating a specific value of one of the plurality of parameters on one of the plurality of analog gauges, a second end of each pointer being displaced from the common central point, wherein at least one of the pointers moves relative to the arc of a curved analog gauge to indicate a value of the parameter to which the curved analog gauge corresponds.

10. The system of claim 9, wherein the machine instructions that cause the processor to display a plurality of analog gauges, cause the processor to:
    (a) determine a number of different parameters to be displayed by the plurality of gauges;
    (b) determine the common central point in a display area;
    (c) determine a gauge disposition relative to the common central point for each of the plurality of gauges, the number of gauges comprising the plurality of gauges corresponding to the number of different parameters to be displayed; and
    (d) display a different one of the plurality of gauges at each gauge disposition that was determined.

11. The system of claim 10, wherein the machine instructions further cause the processor to at least one of:
    (a) determine an orientation of each of the plurality of gauges;
    (b) determine a size of each of the plurality of gauges; and
    (c) determine a scale of values for use as indicators on each of the plurality of gauges.

12. The system of claim 10, wherein the machine instructions that cause the processor to display a plurality of pointers, cause the processor to:
    (a) determine an initial location of the first end of each pointer in relation to each gauge;
    (b) display the first end of each pointer at the initial location that was determined;
    (c) animate the display of each pointer by showing the pointer moving as the value of the parameter indicated by the pointer changes that further causes the processor to move the first end of the pointer from a disposition that corresponds to a previous value of the parameter, to a new disposition corresponding to a new value of the parameter; and (d) animate the display of a gauge as the value of the parameter indicated with the gauge changes.

13. The system of claim 9, wherein the machine instructions further cause the processor to change a color of a component on the plurality of analog gauges to indicate a status of interest.

14. The system of claim 9, wherein the machine instructions further cause the processor to display indicators that are non-concentric about the common central point.

15. The system of claim 9, wherein the plurality of gauges and the plurality of pointers are semi-transparent.

16. A method for indicating a value for each of a plurality of parameters on a graphic display, comprising the steps of:

(a) displaying a plurality of curved analog gauges arrayed concentrically about a common central point, wherein each curved analog gauge corresponds to a different one of the plurality of parameters, and wherein each parameter is displayed as a range of values on the gauge that extend in an arc; and (b) indicating a specific value for the parameter indicated by each of the plurality of curved analog gauges by varying a relative position of an indicator that moves along the arc formed by the range of values for the curved analog gauge, to indicate the specific value, wherein the indicator comprises one of:

a pointer, an end of the pointer moving relative to the arc of the curved analog gauge to indicate a value of the parameter to which the curved analog gauge corresponds; and the curved analog gauge, said curved analog gauge moving relative to the pointer to indicate a value of the parameter to which the curved analog gauge corresponds.

17. The method of claim 16, wherein the step of displaying the plurality of curved analog gauges comprises the steps of:

(a) determining the range of values for each of the plurality of parameters;

(b) determining a location of the common central point on the graphic display;

(c) determining a critical value from the range of values representative of the parameter to which each curved analog gauge corresponds;

(d) assigning an indication of the critical value for each curved analog gauge to a critical value location along the arc of the curved analog gauge, wherein the critical value location along the arc is selected to enable the value it represents to be immediately recognized, the critical location being selected as one of a twelve o'clock position, a three o'clock position, a six o'clock position, and a nine o'clock position about the common central point; and (e) determining a start position and an end position of each curved analog gauge relative to the critical value location and as a function of the range of values for the curved analog gauge and a location of the common central point; and (f) rendering the plurality of curved analog gauges in arcs concentrically about the common central point so that each curved analog gauge extends from the start position to the end position of the curved analog gauge.

18. The method of claim 16, wherein the step of indicating a specific value of each of the plurality of parameters comprises the step of rendering a pointer having a first end disposed at a location along the curved analog gauge corresponding to the parameter, wherein the location of the first end represents the specific value in relation to the range of values for said parameter, and wherein the pointer further has a second end directed toward the common central point.

19. The method of claim 16, wherein the plurality of analog gauges are semi-transparent.

20. A machine readable medium storing machine instructions for performing the steps of claim 16.

* * * * *

UNITED STATES PATENT AND TRADEMARK OFFICE
CERTIFICATE OF CORRECTION

| | | |
|---|---|---|
| PATENT NO. | : 7,380,215 B2 | Page 1 of 1 |
| APPLICATION NO. | : 11/096496 | |
| DATED | : May 27, 2008 | |
| INVENTOR(S) | : Olof Markus Nystrom et al. | |

It is certified that error appears in the above-identified patent and that said Letters Patent is hereby corrected as shown below:

In Face page, in field (54), under "Title" column 1, line 1, delete "GUAGES" and insert -- GAUGES --, therefor.

In column 1, line 1, delete "GUAGES" and insert -- GAUGES --, therefor.

Signed and Sealed this
Nineteenth Day of April, 2011

David J. Kappos
*Director of the United States Patent and Trademark Office*